United States Patent
Feldman et al.

(10) Patent No.: US 11,019,404 B2
(45) Date of Patent: May 25, 2021

(54) MULTI-PROTOCOL MESSAGE DISTRIBUTION SYSTEM

(71) Applicant: Disney Enterprises, Inc., Burbank, CA (US)

(72) Inventors: Vladislav Feldman, Manhasset Hills, NY (US); Michael J. Strein, Bohemia, NY (US); Efthimis Stefanidis, Douglaston, NY (US); Dan Fogel, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 51 days.

(21) Appl. No.: 15/486,082

(22) Filed: Apr. 12, 2017

(65) Prior Publication Data

US 2018/0302688 A1    Oct. 18, 2018

(51) Int. Cl.
| | |
|---|---|
| *H04N 21/643* | (2011.01) |
| *H04N 21/258* | (2011.01) |
| *H04N 21/235* | (2011.01) |
| *H04N 21/6332* | (2011.01) |
| *H04N 21/81* | (2011.01) |

(52) U.S. Cl.
CPC ....... *H04N 21/6332* (2013.01); *H04N 21/235* (2013.01); *H04N 21/25808* (2013.01); *H04N 21/643* (2013.01); *H04N 21/8126* (2013.01); *H04N 21/8166* (2013.01)

(58) Field of Classification Search
CPC .. H04N 21/633; H04N 21/6332; H04N 21/64; H04N 21/643; H04N 21/235; H04N 21/2355; H04N 21/8126; H04N 21/8166
See application file for complete search history.

(56) References Cited

U.S. PATENT DOCUMENTS

| | | | | |
|---|---|---|---|---|
| 5,872,926 A | * | 2/1999 | Levac | H04L 29/06 379/100.08 |
| 5,874,985 A | * | 2/1999 | Matthews, III | H04N 7/165 348/E7.071 |
| 7,284,261 B1 | * | 10/2007 | Connelly | H04N 7/163 348/E7.061 |
| 7,308,697 B1 | * | 12/2007 | Jerding | H04L 12/2801 348/E7.063 |

(Continued)

*Primary Examiner* — James R Sheleheda (74) *Attorney, Agent, or Firm* — Farjami & Farjami LLP (57) ABSTRACT

According to one implementation, a multi-protocol message distribution system includes a computing platform having a hardware processor and a system memory storing a multi-protocol messaging software code. The hardware processor is configured to execute the multi-protocol messaging software code to receive a first video stream including programming content and at least one command message for distribution to multiple destination devices. The first video stream further includes multiple command message protocols for enabling execution of the command message. The hardware processor is further configured to execute the multi-protocol messaging software code to identify a command message protocol requirement of each of the destination devices, and to selectively address a second video stream including the programming content, the command message, and at least one of the command message protocols for enabling execution of the command message to each of the destination devices based on its respective command message protocol requirement.

17 Claims, 4 Drawing Sheets

(56) References Cited

U.S. PATENT DOCUMENTS

| | | | |
|---|---|---|---|
| 10,193,835 B1* | 1/2019 | Ledet | H04L 51/063 |
| 2002/0144262 A1* | 10/2002 | Plotnick | H04N 21/252 |
| | | | 725/32 |
| 2003/0104805 A1* | 6/2003 | Weksel | H04M 3/53375 |
| | | | 455/414.4 |
| 2007/0074240 A1* | 3/2007 | Addington | H04N 21/2543 |
| | | | 725/25 |
| 2007/0146542 A1* | 6/2007 | Strasser | H04N 21/4181 |
| | | | 348/462 |
| 2011/0082946 A1* | 4/2011 | Gopalakrishnan | H04L 67/2828 |
| | | | 709/231 |
| 2011/0265116 A1* | 10/2011 | Stern | H04L 12/2801 |
| | | | 725/35 |
| 2011/0314493 A1* | 12/2011 | Lemire | H04N 21/23424 |
| | | | 725/32 |
| 2013/0007815 A1* | 1/2013 | Jackson | H04N 21/812 |
| | | | 725/63 |
| 2013/0064283 A1* | 3/2013 | Sun | H04N 21/23439 |
| | | | 375/240.01 |
| 2013/0086601 A1* | 4/2013 | Adimatyam | H04N 21/23424 |
| | | | 725/1 |
| 2013/0229583 A1* | 9/2013 | Kuciera | H04N 21/4131 |
| | | | 348/734 |
| 2013/0262693 A1* | 10/2013 | Phillips | H04N 21/222 |
| | | | 709/231 |
| 2013/0307942 A1* | 11/2013 | Dini | H04N 5/44591 |
| | | | 348/51 |
| 2014/0033255 A1* | 1/2014 | Daly | H04N 21/4786 |
| | | | 725/37 |
| 2014/0068789 A1* | 3/2014 | Watts | H04L 65/605 |
| | | | 726/29 |
| 2014/0173584 A1* | 6/2014 | Gayrard | G06F 8/65 |
| | | | 717/170 |
| 2014/0282736 A1* | 9/2014 | Elstermann | H04N 21/4821 |
| | | | 725/50 |
| 2015/0281395 A1* | 10/2015 | Pandiarajan | H04L 67/16 |
| | | | 709/219 |
| 2015/0350702 A1* | 12/2015 | Strein | H04N 21/64322 |
| | | | 725/36 |
| 2016/0119274 A1* | 4/2016 | Ghafourifar | H04L 51/14 |
| | | | 709/206 |
| 2016/0373799 A1* | 12/2016 | Scovanner | H04N 21/4312 |
| 2017/0094327 A1* | 3/2017 | Harrell | H04N 21/2407 |
| 2017/0104669 A1* | 4/2017 | Bell | H04L 65/4076 |
| 2018/0131975 A1* | 5/2018 | Badawiyeh | H04N 21/222 |
| 2018/0192106 A1* | 7/2018 | Loheide | H04N 21/262 |
| 2019/0149868 A1* | 5/2019 | Singh | H04N 21/2402 |
| | | | 709/231 |

* cited by examiner

MULTI-PROTOCOL MESSAGE DISTRIBUTION SYSTEM

BACKGROUND

Video source and distribution facilities are becoming increasingly complex. For example, in many cases, the video source devices, the devices for processing video, and the devices for distributing video are not co-located, and in some instances may be geographically remote from one another. Automation services, i.e., services providing command and control instructions for the video, typically operate in parallel with video origination, processing, and distribution. Those automation services may utilize communication networks to send real-time commands to the source, processing, and distribution devices for the video.

However, when the source, processing, and distribution devices for the video are geographically remote from one another, it can be difficult or impossible to exercise parallel control over those remote devices so as to maintain video accuracy. In addition, the diversity of messaging protocols utilized by the destination devices receiving the video introduce additional challenges to distributing real-time command messages while maintaining video accuracy.

SUMMARY

There are provided multi-protocol message distribution systems and methods, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As described above, video source and distribution facilities are becoming increasingly complex. In many cases, the video source devices, the devices for processing video, and the devices for distributing video are not co-located, and in some instances may be geographically remote from one another. Automation services, i.e., services providing command and control instructions for the video, typically operate in parallel with the video origination, processing, and distribution. Those automation services may utilize communication networks to send real-time commands to the source, processing, and distribution devices for the video.

However, and as further described above, when the source, processing, and distribution devices for the video are geographically remote from one another, it can be difficult or impossible to exercise parallel control over those remote devices so as to maintain video accuracy. In addition, the diversity of messaging protocols utilized by the destination devices receiving the video introduce additional challenges to distributing real-time command messages while maintaining video accuracy.

The present application discloses a solution for distributing command messages for video that addresses and overcomes the deficiencies in the conventional art. By using the source video as a carrier for command messages directed to destination devices for the video, such as video servers or client systems equipped with graphics devices, the present solution advantageously synchronizes delivery of the command messages with distribution of the video to those destination devices. In addition, by selectively addressing command message protocols also carried by the source video to the destination devices based on the individual command message protocol requirements of each destination device, the present solution further advantageously maintains video accuracy.

Figure 1:
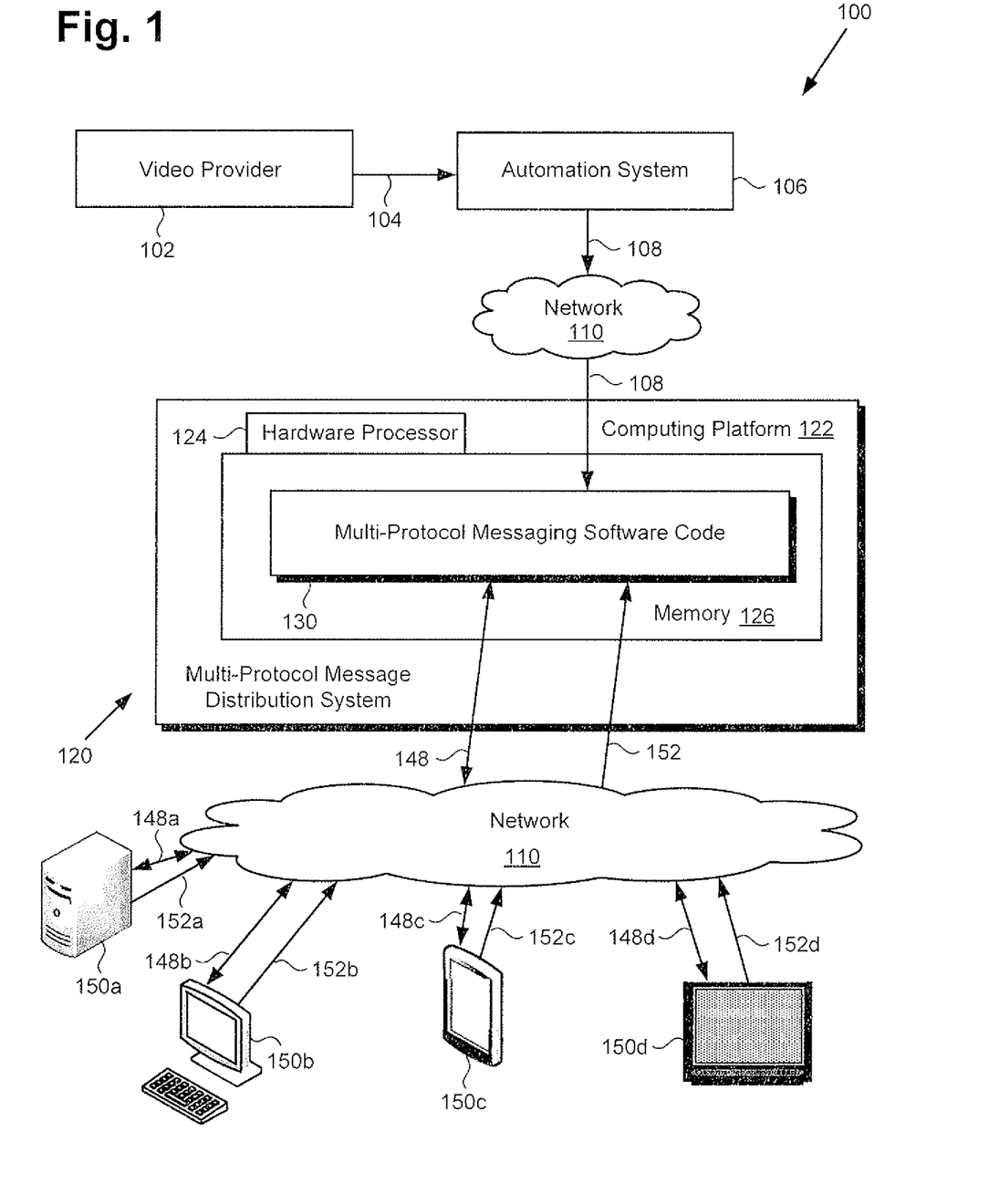
FIG. 1 shows a diagram of an exemplary multi-protocol message distribution system, according to one implementation.

FIG. 1 shows a diagram of exemplary multi-protocol message distribution system 120, according to one implementation. As shown in FIG. 1, video distribution environment 100 includes multi-protocol message distribution system 120 including computing platform 122 having hardware processor 124 and system memory 126 storing multi-protocol messaging software code 130. Also shown in FIG. 1 are video provider 102 providing source video 104, automation system 106, and first video stream 108 received by multi-protocol message distribution system 120 via communication network 110.

In addition, FIG. 1 shows destination devices 150a, 150b, 150c, and 150d (hereinafter "destination devices 150a-150d") interactively linked to multi-protocol message distribution system 120 via communication network 110. Further shown in FIG. 1 is second video stream 148 selectively addressed to each of destination devices 150a-150d as respective second video streams 148a, 148b, 148c, and 148d (hereinafter "second video streams 148a-148d"). Also shown is network communication 152 including individual communications 152a, 152b, 152c, and 152d (hereinafter "communications 152a-152d") received by multi-protocol message distribution system 120 from respective destination devices 150a-150d.

It is noted that although FIG. 1 depicts multi-protocol message distribution system 120 as including single computing platform 122, more generally, multi-protocol message distribution system 120 may include one or more computing platforms, such as computer servers for example, which may be co-located, or may form an interactively linked but distributed system. For example, multi-protocol message distribution system 120 may be a cloud based system. As a result, hardware processor 124 and system memory 126 may correspond to distributed processor and memory resources within multi-protocol message distribution system 120. Thus, it is to be understood that the features attributed to multi-protocol messaging software code 130 below by reference to FIG. 2 of the present application may be stored remotely from one another within the distributed memory resources of multi-protocol message distribution system 120.

According to the implementation of FIG. 1, multi-protocol message distribution system 120 may utilize hardware processor 124 to execute multi-protocol messaging software code 130 to selectively address second video streams 148a-148d corresponding to first video stream 108 to respective destination devices 150a-150d. Second video streams 148a-148d may include command messages carried by first video stream 108, as well as one or more command message protocols compatible with the command message protocol requirements of each of respective destination devices 150a-150d.

For example, hardware processor 124 may execute multi-protocol messaging software code 130 to receive first video stream 108 including programming content and at least one command message for distribution to destination devices 150a-150d. Moreover, first video stream 108 may also include multiple command message protocols for enabling execution of the command message or messages by a destination device, such as destination devices 150a-150d. Multi-protocol messaging software code 130 may be further executed by hardware processor 124 to identify a command message protocol requirement of each of destination devices 150a-150d, and to selectively address second video streams 148a-148d to respective destination devices 150a-150d based on their individual command message protocol requirements.

It is noted that, although destination devices 150a-150d are shown variously as video server 150a, personal computer (PC) 150b, mobile communication device 150c, and smart TV 150d, in FIG. 1, those representations are provided merely by way of example. In other implementations, destination devices 150a-150d may include any suitable client system including a graphics device, for example. That is to say, in other implementations, destination devices 150a-150d may include any or all of a laptop computer, tablet computer, digital media player, gaming console, or smartphone, for example.

In one implementation, video provider 102 may be a media entity providing TV content as source video 104. Source video 104 may be a linear TV program stream, for example, including an ultra high-definition (ultra HD), HD, or standard-definition (SD) baseband video signal with embedded audio, captions, time code, and other ancillary metadata, such as ratings and/or parental guidelines. In some implementations, source video 104 may include multiple audio tracks, and may utilize secondary audio programming (SAP) and/or Descriptive Video Service (DVS), for example.

Source video 104 may be the same source video broadcast to a traditional TV audience using a TV broadcasting platform (not shown in FIG. 1), which may include a conventional cable and/or satellite network, for example. In addition, and as depicted in FIG. 1, video provider 102 may find it advantageous or desirable to make programming content from source video 104 available via an alternative distribution channel, such as communication network 110, which may include a packet network, for example, such as the Internet.

Video provider 102 may choose to selectively replace one or more content features in source video 104, such as program episodes, advertisements or blocks of advertising, or promotions, based on any of a variety of business choices, such as business requirements related to distribution rights, or programming preferences, for example. Consequently, one or more kinds of command messages may be inserted into source video 104 by automation system 106 prior to its distribution as first video stream 108, over communication network 110. For example, the command messages inserted by automation system 106 and carried by first video stream 108 may be American National Standards Institute (ANSI) and Society of Cable Telecommunications Engineers (SCTE) standard 104 (ANSI/SCTE 104) compliant command messages.

It is reiterated that according to various implementations of the present inventive principles, first video stream 108 has embedded therein one or more command messages and multiple command message protocols for enabling execution of the command message or messages by a destination device. Thus, the present approach is to be contrasted to SCTE standard 224, in which command message protocols may be transmitted in parallel with, i.e., out-of-band, with respect to video, and are synched to the video at a destination, such as a cable headend, for example.

Figure 2:
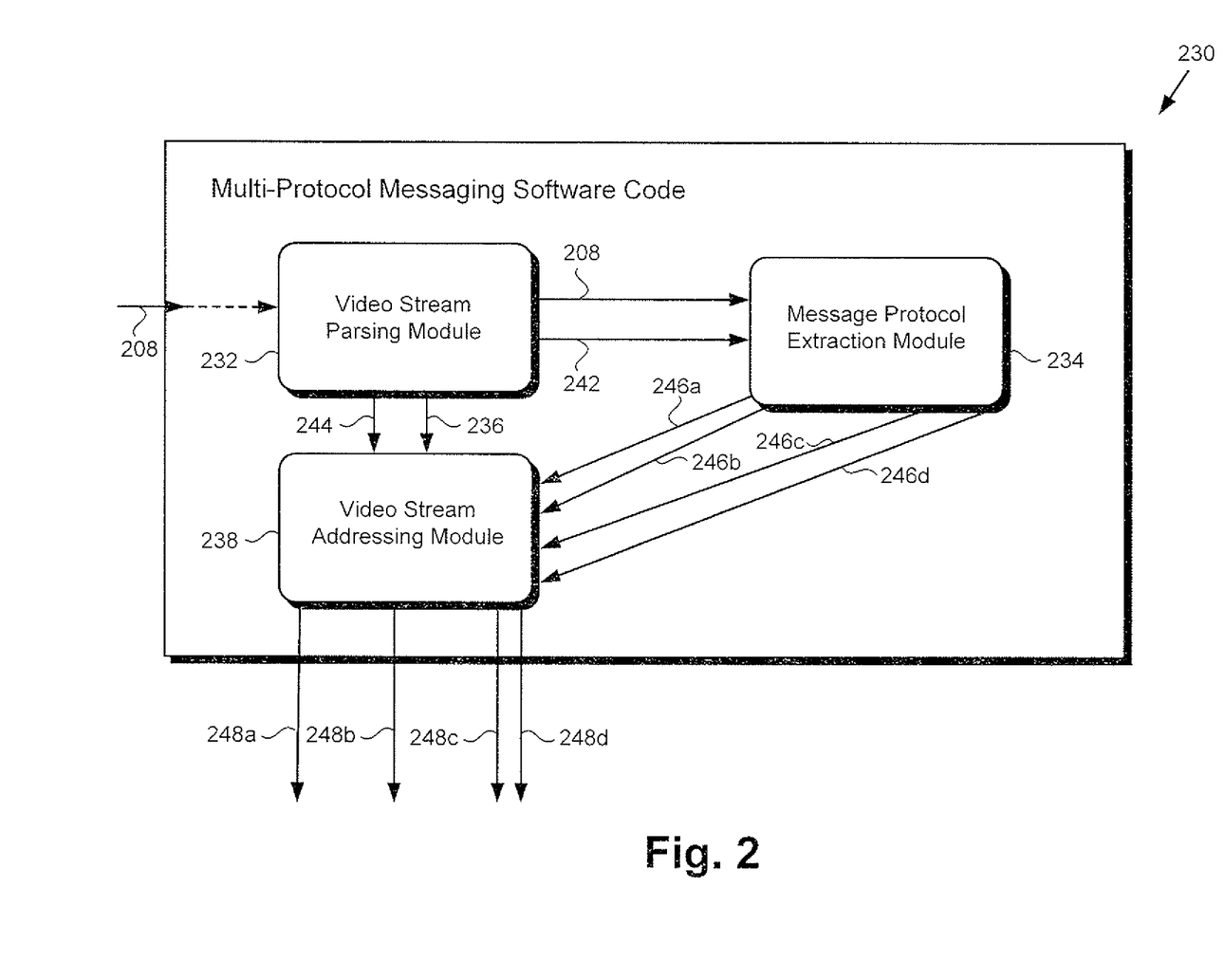
FIG. 2 shows a diagram of an exemplary multi-protocol messaging software code suitable for use by a multi-protocol message distribution system, according to one implementation.

FIG. 2 shows a more detailed diagram of exemplary multi-protocol messaging software code 230 suitable for use by multi-protocol message distribution system 120, in FIG. 1, according to one exemplary implementation. As shown in FIG. 2, multi-protocol messaging software code 230 may receive first video stream 208 as an input, and may selectively address second video streams 248a, 248b, 248c, and 248d (hereinafter "second video streams 248a-248d") to various destination devices as outputs. As further shown in FIG. 2, multi-protocol messaging software code 230 includes video stream parsing module 232, message protocol extraction module 234, and video stream addressing module 238.

Also shown in FIG. 2 are command message protocol identification data 242, one or more command messages 244 (hereinafter "command message(s) 244"), programming content 236 of first video stream 208, and command message protocols 246a, 246b, and 246c (hereinafter "command message protocols 246a-246c"). Multi-protocol messaging software code 230 including video stream parsing module 232, message protocol extraction module 234, and video stream addressing module 238 corresponds in general to multi-protocol messaging software code 130, in FIG. 1, and those corresponding features may share any of the characteristics attributed to either corresponding feature by the present disclosure. That is to say, any characteristics attributed to multi-protocol messaging software code 130 may also be attributed to multi-protocol messaging software code 230, and any characteristics attributed to multi-protocol messaging software code 230 may also be attributed to multi-protocol messaging software code 130.

First video stream 208, in FIG. 2, corresponds in general to first video stream 108, in FIG. 1, and may share any of the characteristics attributed to that corresponding feature by the present disclosure. Moreover, second video streams 248a-248d correspond respectively in general to second video streams 148a-148d, and those corresponding features may share any of the characteristics attributed to either corresponding feature by the present disclosure.

Figure 3:
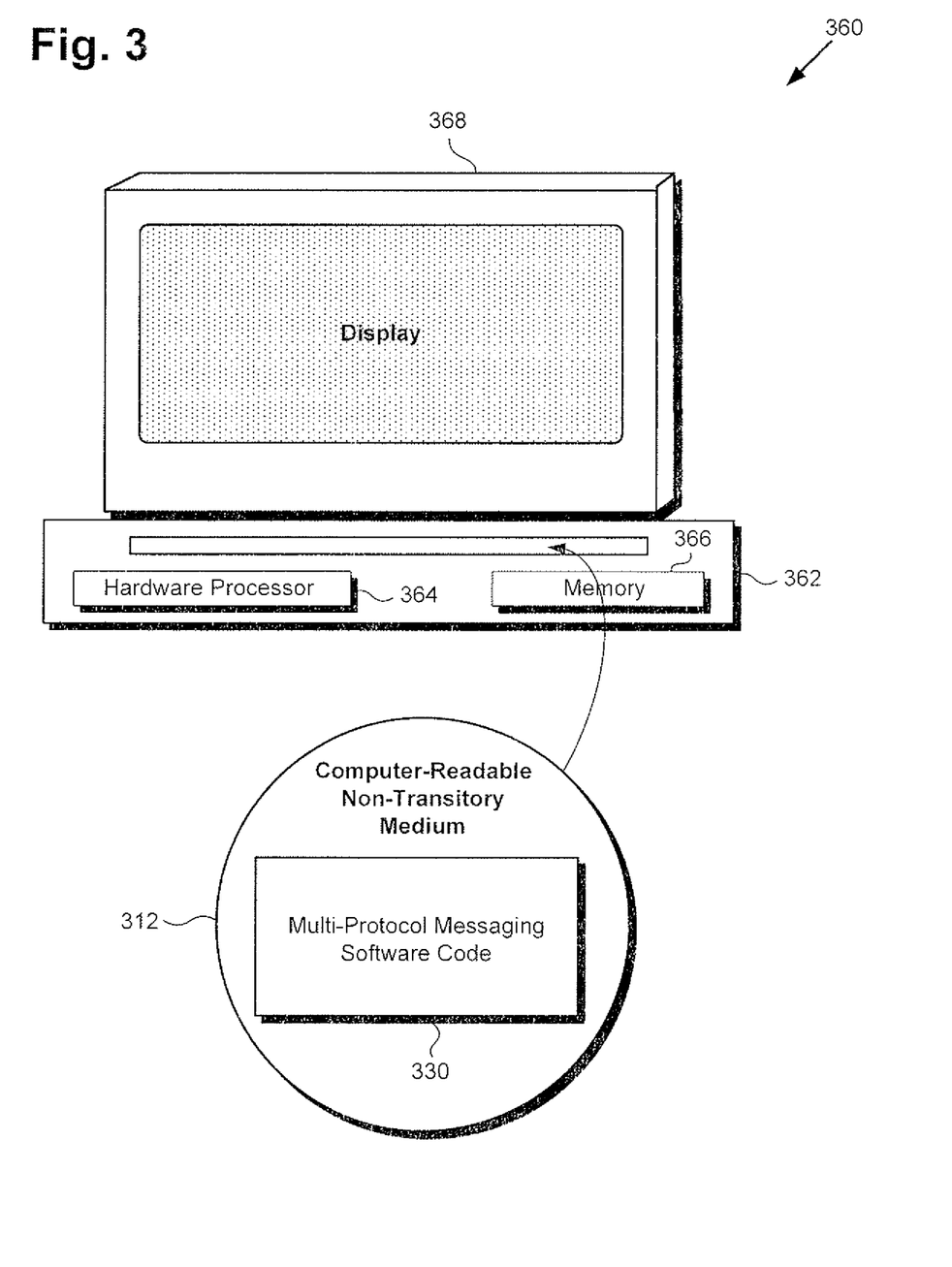
FIG. 3 shows an exemplary system and a computer-readable non-transitory medium including instructions enabling execution of a method for performing multi-protocol message distribution, according to one implementation.

FIG. 3 shows exemplary system 360 and computer-readable non-transitory medium 312 including instructions enabling execution of a method for performing multi-protocol message distribution, according to one implementation. System 360 includes computer 362 having hardware processor 364 and system memory 366, interactively linked to display 368. Display 368 may take the form of a liquid crystal display (LCD), a light-emitting diode (LED) display, an organic light-emitting diode (OLED) display, or another suitable display screen that performs a physical transformation of signals to light.

Also shown in FIG. 3 is computer-readable non-transitory medium 312 having multi-protocol messaging software code 330 stored thereon. The expression "computer-readable non-transitory medium," as used in the present application, refers to any medium, excluding a carrier wave or other transitory signal, that provides instructions to hardware processor 364 of computer 362. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 312 provides multi-protocol messaging software code 330 for execution by hardware processor 364 of computer 362. Multi-protocol messaging software code 330 corresponds in general to multi-protocol messaging software code 130/230, in FIGS. 1 and 2, and is capable of performing all of the operations attributed to those corresponding features by the present disclosure. In other words, in implementations in which hardware processor 364 of system 360 accesses computer-readable non-transitory medium 312 and executes multi-protocol messaging software code 330, system 360 may perform any of the actions attributed to multi-protocol message distribution system 120 by the present disclosure.

Figure 4:
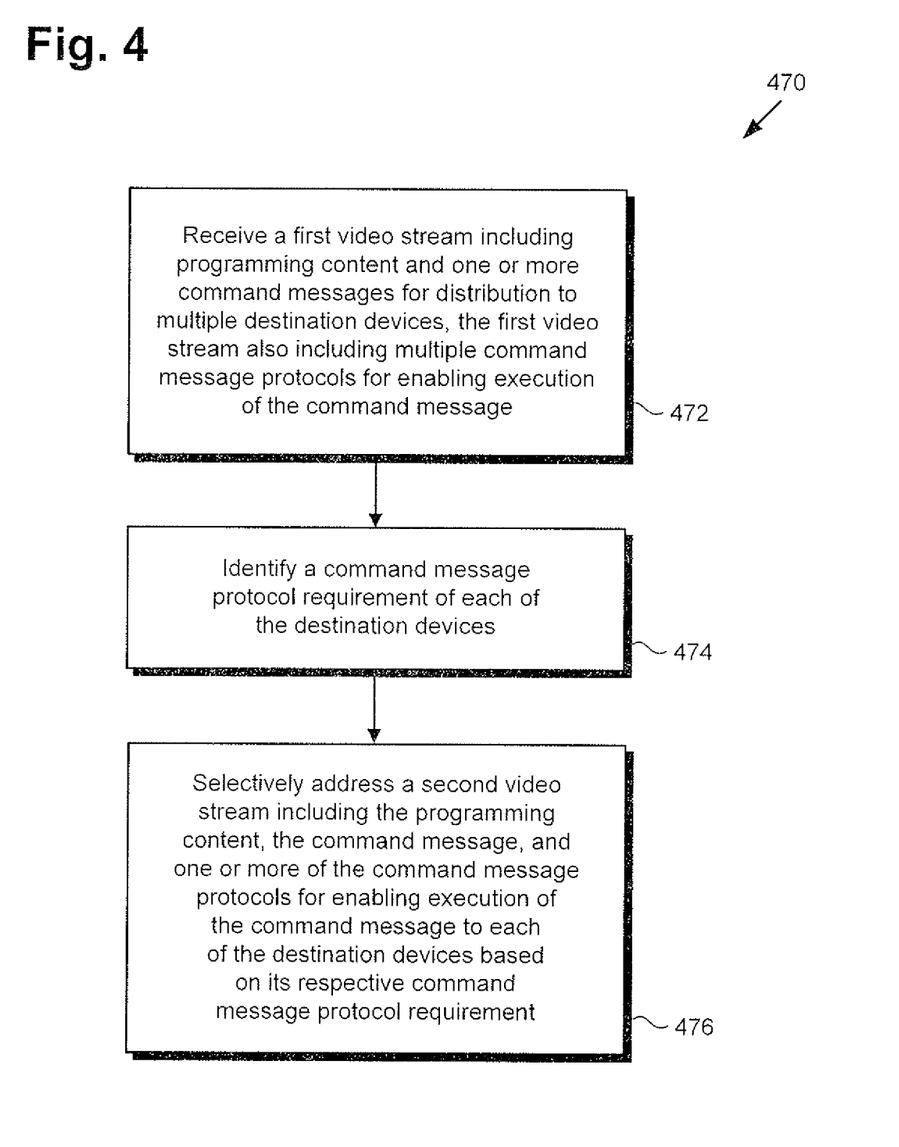
FIG. 4 shows a flowchart presenting an exemplary method for performing multi-protocol message distribution, according to one implementation.

The functionality of multi-protocol messaging software code 130/230/330 will be further described by reference to FIG. 4 in combination with FIGS. 1, 2, and 3. FIG. 4 shows flowchart 470 presenting an exemplary method for performing multi-protocol message distribution, according to one implementation.

Referring to FIG. 4 in combination with FIGS. 1, 2, and 3, flowchart 470 begins with receiving first video stream 108/208 including programming content 236 and command message(s) 244 for distribution to destination devices 150a-150d (action 472). As discussed above, in addition to programming content 236 and command message(s) 244, first video stream 108/208 also includes command message protocols 246a-246d for enabling execution of command message(s) 244. Command message(s) 244a and command message protocols 246a-246d may be inserted into source video 104 by automation system 106, resulting in first video stream 108/208 carrying command message(s) 244 and command message protocols 246a-246d in-band. First video stream 108/208 carrying programming content 236, command message(s) 244, and command message protocols 246a-246d may be received by multi-protocol messaging software code 130/230/330, executed by hardware processor 124/364.

Command message(s) 244 may take a variety of forms. For example, command message(s) 244 may include one or more instructions for playout of first video stream 108/208. In addition, or alternatively, command message(s) 244 may include layout instructions for displaying programming content 236 carried by first video steam 108/208. In some implementations, command message(s) 244 may include updated data, such as sports scores, news, or weather data, for example. Moreover, in some implementations, command message(s) 244 may include a software update for respective destination devices 150a-150d.

Flowchart 470 continues with identifying a command message protocol requirement of each of destination devices 150a-150d (action 474). In some implementations, for example, each of destination devices 150a-150d may utilize different command message protocols. In those cases, the command message protocol requirements of each of destination devices 150a-150d needs to be identified before second video streams 148a-148d/248a-248d can be selectively and appropriately addressed to respective destination devices 150a-150d. Identification of the respective command message protocol requirements of each of destination devices 150a-150d may be performed using video stream parsing module 232 of multi-protocol messaging software code 130/230/330, executed by hardware processor 124/364.

Action 474 results in first video stream 108/208 and command message protocol identification data 242 being transferred to message protocol extraction module 234. Multi-protocol messaging software code 130/230/330, executed by hardware processor 124/364, may utilize message protocol extraction module 234 to extract command message protocols 246a-246d from first video stream 108/208, and to route command message protocols 246a-246d to video stream addressing module 238. In addition, and as shown by FIG. 2, programming content 236 and command message(s) 244 are routed to video stream addressing module 238 from video stream parsing module 232.

In some implementations, Flowchart 470 can conclude with selectively addressing second video streams 148a-148d/248a-248d including programming content 236, command message(s) 244, and at least one of command message protocols 246a-246d to each of destination devices 150a-150d based on its respective command message protocol requirement (action 476). Second video streams 148a-148d/248a-248d may be selectively addressed to respective destination devices 150a-150 using their respective Internet protocol (IP) addresses, media access control (MAC) address, or any other suitable addressing scheme.

Consequently, second video streams 148a-148d/248a-248d are transmitted to respective destination devices 150a-150d. Selectively addressing second video streams 148a-148d/248a-248d to each of destination devices 150a-150d based on its respective command message protocol requirement may be performed using video stream addressing module 238 of multi-protocol messaging software code 130/230/330, executed by hardware processor 124/364.

According to some implementations, the method of flowchart 470 may further include receiving one or more of communications 152a-152d from respective destination devices 150a-150d. Communications 152a-152d may be communications confirming receipt of second video streams 148a-148d/248a-248d. Alternatively, or in addition, communications 152a-152d may confirm execution of command message(s) 244, or may report the status of respective destination device 150a-150d. One or more of communications 152a-152d from respective destination devices 150a-150d may be received by multi-protocol messaging software code 130/230/330, executed by hardware processor 124/364.

It is noted that, in some implementations, communications 152a-152d may be received by multi-protocol message distribution system 120 out-of-band, i.e., as a communication separate from respective second video streams 148a-148d/248a-248d. However, as shown in FIG. 1, in some implementations, second video streams 148a-148d/248a-248d may be bidirectional. In those latter implementations, communications 152a-152d may be received by multi-protocol message distribution system 120 in-band, i.e., communications 152a-152d may be carried by respective second video streams 148a-148d/248a-248d.

Thus, the present application discloses a solution for distributing command messages for video that addresses and overcomes the deficiencies in the conventional art. By using the source video as a carrier for command messages directed to destination devices for the video, such as video servers or client systems equipped with graphics devices, the present solution advantageously synchronizes delivery of the command messages with distribution of the video to those destination devices. In addition, by selectively addressing command message protocols also carried by the source video to the destination devices based on the individual command message protocol requirements of each destination device, the present solution further advantageously maintains video accuracy.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A multi-protocol message distribution system comprising:
   a computing platform including a hardware processor and a system memory;
   a multi-protocol messaging software code stored in the system memory;
   the hardware processor configured to execute the multi-protocol messaging software code to:
      receive a first video stream including programming content and at least one command message for distribution to a plurality of destination devices, the at least one command message including at least one of a sports score, news data, or weather data, the first video stream further including a plurality of messaging protocols corresponding respectively to the plurality of destination devices;
      identify a respective messaging protocol requirement of each of the plurality of destination devices, wherein each of the plurality of destination devices uses a different one of the plurality of messaging protocols;
      extract, using a message protocol extraction module of the multi-protocol messaging software code, a respective one of the plurality of messaging protocols for each of the plurality of destination devices according to the respective messaging protocol requirement of each of the plurality of destination devices; and
      selectively address a second video stream including the programming content and the at least one command message to each of the plurality of destination devices based on the identified respective messaging protocol requirement of each of the plurality of destination devices to enable execution of the at least one command message by each of the plurality of destination devices.

2. The multi-protocol message distribution system of claim 1, wherein the plurality of destination devices comprise at least one of a video server or a client system including a graphics device.

3. The multi-protocol message distribution system of claim 1, wherein the at least one command message comprises at least one instruction for playout of the video stream.

4. The multi-protocol message distribution system of claim 1, wherein the at least one command message comprises at least one updated data.

5. The multi-protocol message distribution system of claim 1, wherein the hardware processor is further configured to execute the multi-protocol messaging software code to receive a communication from at least one of the plurality of destination devices.

6. The multi-protocol message distribution system of claim 1, wherein the video stream is bidirectional, and wherein the hardware processor is further configured to execute the multi-protocol messaging software code to receive an in-band communication from at least one of the plurality of destination devices.

7. A method for use by a multi-protocol message distribution system including a computing platform having a hardware processor and a system memory storing a multi-protocol messaging software code, the method comprising:
   receiving, using the hardware processor, a first video stream including programming content and at least one command message for distribution to a plurality of destination devices, the at least one command message including at least one of a sports score, news data, or weather data, the first video stream further including a plurality of messaging protocols corresponding respectively to the plurality of destination devices;
   identifying, using the hardware processor, a respective messaging protocol requirement of each of the plurality of destination devices, wherein each of the plurality of destination devices uses a different one of the plurality of messaging protocols;
   extracting, using a message protocol extraction module of the multi-protocol messaging software code, a respective one of the plurality of messaging protocols for each of the plurality of destination devices according to the respective messaging protocol requirement of each of the plurality of destination devices; and
   selectively addressing, using the hardware processor, a second video stream including the programming content and the at least one command message to each of the plurality of destination devices based on the identified respective messaging protocol requirement of each of the plurality of destination devices to enable execution of the at least one command message by each of the plurality of destination devices.

8. The method of claim 7, wherein the plurality of destination devices comprise at least one of a video server or a client system including a graphics device.

9. The method of claim 7, wherein the at least one command message comprises at least one instruction for playout of the video stream.

10. The method of claim 7, wherein the at least one command message comprises at least one updated data.

11. The method of claim 7, further comprising receiving, using the hardware processor, a communication from at least one of the plurality of destination devices.

12. The method of claim 7, wherein the video stream is bidirectional, and further comprising receiving, using the hardware processor, an in-band communication from at least one of the plurality of destination devices.

13. A multi-protocol message distribution system comprising:
- a computing platform including a hardware processor and a system memory;
- a multi-protocol messaging software code stored in the system memory;
- the hardware processor configured to execute the multi-protocol messaging software code to:
  - receive a first video stream including programming content and at least one command message for distribution to a plurality of destination devices, the first video stream further including a plurality of messaging protocols corresponding respectively to the plurality of destination devices;
  - identify a respective messaging protocol requirement of each of the plurality of destination devices, wherein each of the plurality of destination devices uses a different one of the plurality of messaging protocols;
  - extract, using a message protocol extraction module of the multi-protocol messaging software code, a respective one of the plurality of messaging protocols for each of the plurality of destination devices according to the respective messaging protocol requirement of each of the plurality of destination devices; and
  - selectively address a second video stream including the programming content and the at least one command message to each of the plurality of destination devices based on the identified respective messaging protocol requirement of each of the plurality of destination devices to enable execution of the at least one command message by each of the plurality of destination devices.

14. The multi-protocol message distribution system of claim 13, wherein the plurality of destination devices comprise at least one of a video server or a client system including a graphics device.

15. The multi-protocol message distribution system of claim 13, wherein the at least one command message comprises at least one instruction for playout of the video stream.

16. The multi-protocol message distribution system of claim 13, wherein the at least one command message comprises at least one updated data.

17. The multi-protocol message distribution system of claim 13, wherein the at least one command message comprises a software update for at least one of the plurality of destination devices.

* * * * *